July 4, 1961 J. VACKÁŘ 2,991,423
LOW-FREQUENCY REGENERATIVE AMPLIFIER
Filed Dec. 9, 1958
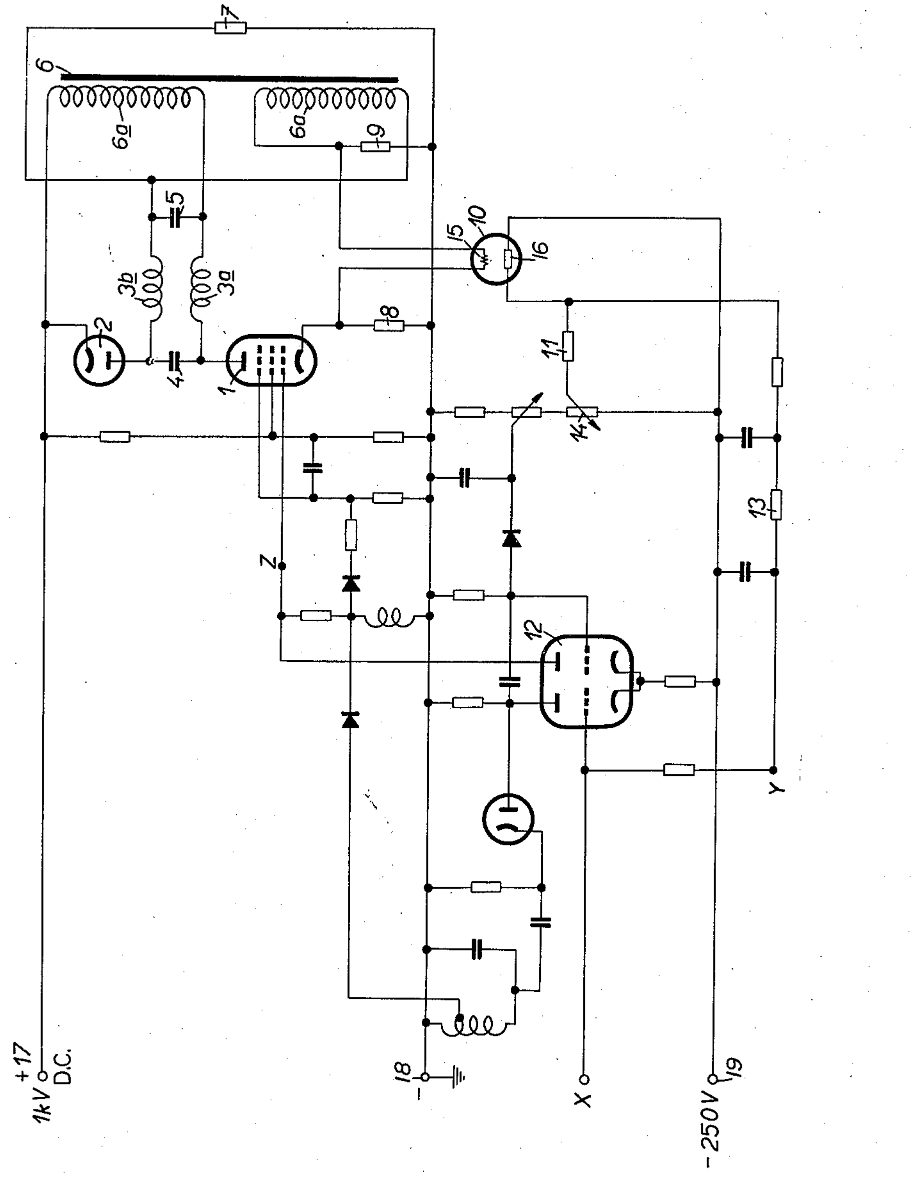
INVENTOR.
Jiří Vackář
BY
Richard Low
Agt United States Patent Office 2,991,423
Patented July 4, 1961

2,991,423

LOW-FREQUENCY REGENERATIVE AMPLIFIER

Jiří Vackář, Prague, Czechoslovakia, assignor to Tesla, národní podnik, Prague, Czechoslovakia Filed Dec. 9, 1958, Ser. No. 779,212
Claims priority, application Czechoslovakia Feb. 19, 1958
1 Claim. (Cl. 330—10)

This invention relates to a low-frequency regenerative amplifier, i.e. an amplifier controlled by pulses, which consists basically of a multi-electrode amplifier tube, a recovery diode, two pulse chokes, an output transformer and a stabilizing path, wherein the stabilizing voltage is derived from the circuits of the amplifier tube and recovery diode and is applied at the input of the pulse generator.

A low-frequency amplifier is known, operating with length-modulated pulses, whose carrier frequency is higher than the frequency of signals to be amplified, wherein the output stage of the amplifier includes an amplifying tube and a recovery diode. The anodes of both these tubes are interconnected by a condenser and the cathode of each tube is connected to one pole of a D.C. voltage source. The anode circuit of each tube consists of one pulse choke and one winding of a low-frequency output transformer. A low-frequency amplifier of this kind is described in my application for United States Letters Patent, Serial No. 737,108, filed May 22, 1958.

The amplifier described in the foregoing paragraph, possesses one major drawback, namely, that the no-load current of its tubes (when no input signal is present) very strongly depends on the no-load pulse-length factor of the control pulses. Hence it is rather difficult to maintain the no-load tube currents at a pre-determined value for a substantial length of time.

It is a general object of this invention to provide an improved regenerative amplifier.

A further object of this invention is an improved regenerative amplifier in which the no-load tube currents are stabilized.

One specific embodiment of my invention comprises an amplifying tube and a recovery diode, the anodes of which are mutually connected via a condenser. The circuit of each tube includes an independent pulse choke and a winding of a low-frequency output transformer. The control pulses, generated by a source of length-modulated pulses, are applied to the control grid of the amplifying tube. According to the present invention, a stabilizing voltage, which is derived from the sum of the currents in the amplifier tube circuit and the recovery diode circuit, is applied at the input of the generator producing the width-modulated pulses.

It is a feature of this invention that a single stabilizing voltage is developed in a regenerative amplifier, and that such stabilizing voltage is derived from the sum of the individual currents in two different elements of the amplifier.

In a specific embodiment of the invention, this single stabilizing voltage is developed by an indirectly heated thermistor having a heating filament which is connected between resistors respectively interposed in the circuits of the amplifying tube and the recovery diode of the regenerative amplifier.

The above, and other objects, features and advantages of the invention, will be apparent in the following detailed description of an illustrative embodiment of the invention which is to be read in connection with the accompanying drawing, wherein:

The single figure is a wiring diagram of a regenerative amplifier having a stabilizing circuit in accordance with this invention.

Referring to the figure in detail, it will be seen that the final stage of a regenerative amplifier embodying the present invention includes a D.C. voltage source having a positive terminal 17 and a ground connection or terminal 18 representing the negative terminal of the D.C. voltage source. An amplifier tube 1 having an anode, control grid and cathode, and a diode 2 having a cathode and an anode are included in the final stage of the amplifier. The cathode of diode 2 is connected directly to the positive terminal 17 of the D.C. voltage source, while the cathode of amplifier tube 1 is connected to the negative terminal 18 of the D.C. voltage source by way of a first coupling resistor 8.

The anodes of the amplifier 1 and diode 2, respectively, are connected by way of a capacitor 4. Further, a first impulse choke **3*a* and a first LF choke 6*a* are connected in series between the anode of amplifier tube 1 and the positive terminal 17 of the D.C. voltage source, while a second impulse choke 3*b* and a second LF choke 6*b* are connected in series between the anode of diode 2 and the negative terminal 18 of the D.C. voltage source. As shown in the figure, the LF chokes 6*a* and 6*b* of the amplifier and diode circuits, respectively, may be formed by individual primary windings of a transformer 6. The illustrated circuit further includes a capacitor 5 connected between the impulse chokes 3*a* and 3*b* at the ends of the latter remote from the respective anodes of amplifier tube 1 and diode 2**.

A second coupling resistor 9 is interposed in the connection between the LF choke **6*b* and the negative terminal 18 of the D.C. voltage source. A load 7 is connected across the LF choke 6*b* and also to the negative terminal 18**.

From the above, it will be apparent that the cathode circuit of the amplifying tube 1 includes the resistor 8, across which there is a voltage drop proportional to the cathode current of the amplifying tube 1. The voltage drop across resistor 8 may, therefore, be considered as a stabilizing voltage component, proportional to the average current flowing through the amplifying tube 1. The resistor 9 completes the anode circuit of the recovery diode 2. The voltage appearing on this resistor 9 is proportional to the current flowing through the diode 2, but its polarity is just opposite to the polarity of voltage on the resistor 8. The component of the stabilizing voltage represented by the voltage drop across resistor 9 is, therefore, proportional to the average diode current. The algebraic sum of voltages appearing on both resistors 8 and 9 is applied to the filament 15 of an indirectly heated thermistor 10 which further includes variable resistor 16 connected together with a resistor 11 to form a voltage divider, thus determining the value of the stabilizing voltage. The low frequency regenerative amplifier illustrated in the drawing further includes a pulse generator 12 having an input terminal X for receiving the low frequency signal which is to be amplified and an additional input terminal Y for receiving the stabilizing voltage from the voltage divider 11–16 by way of a connecting circuit 13. The pulse generator 12 further includes an output terminal Z connected to the control grid of amplifying tube 1 and emitting width-modulated impulses. The voltage divider 11–16 is also connected to an auxiliary source 19 of D.C. voltage.

From the above, it will be apparent that the stabilizing voltage, which is derived from the sum of the voltages in the cathode circuit of amplifying tube 1 and in the diode circuit, is applied, as a biasing potential, to the control grid of the generator 12, which produces the width-modulated pulses. The stabilizing circuit is completed by the potentiometer 14 serving for adjustment of the desired value of stabilizing voltage.

The regenerative amplifier, when equipped with the stabilizing arrangement according to the present invention as described above, provides a very effective stabilization of no-load current of tubes.

Although an illustrative embodiment of the invention has been described in detail herein with reference to the accompanying drawing, it is to be understood that such embodiment is merely illustrative of the principles of the invention, and that numerous other arrangements may be devised by those skilled in the art without departing from the scope and spirit of the invention.

What I claim is:

A low frequency regenerative amplifier comprising a final stage including a D.C. voltage source having positive and negative terminals, an amplifier tube having an anode, control grid and cathode, a diode having an anode and cathode, first and second coupling resistors, said cathode of the diode being directly connected to said positive terminal of said D.C. voltage source, said cathode of the amplifier tube being connected to said negative terminal of the D.C. voltage source through said first coupling resistor, a capacitor connected between the anodes of said amplifier and diode, respectively, an amplifier tube circuit including a first impulse choke and a first LF choke connected in series between said amplifier tube anode and said positive terminal of the D.C. voltage source, a diode circuit including a second impulse choke and a second LF choke connected in series with said second coupling resistor between said anode of the diode and said negative terminal of the D.C. voltage source, an output load connected across one of said first and second LF chokes and to a terminal of said D.C.

voltage source, pulse generating means having input terminals for receiving a low frequency signal to be amplified and a D.C. stabilizing voltage and an output terminal connected to said control grid of the amplifier tube and delivering width modulated impulses, an indirectly heated thermistor including a heating filament and a resistive element, said filament being connected between said amplifier tube cathode and said diode circuit at a location in the latter intermediate said second LF choke and said second coupling resistor, an auxiliary source of D.C. voltage, voltage divider means connected to said auxiliary source of D.C. voltage and including said resistive element of the thermistor, and circuit means connecting said resistive element to said input terminal of the pulse generating means intended to receive a D.C. stabilizing voltage so that the mean width of the pulses delivered at said output terminal of the pulse generating means is determined by said D.C. stabilizing voltage which is derived from the sum of the currents in said amplifier tube and diode.

References Cited in the file of this patent

UNITED STATES PATENTS

| | | |
|---|---|---|
| 2,212,337 | Brewer | Aug. 20, 1940 |
| 2,273,193 | Heising | Feb. 17, 1942 |
| 2,740,086 | Evans et al. | Mar. 27, 1956 |
| 2,885,612 | Larsen | May 5, 1959 |
| 2,894,234 | Weiss et al. | July 7, 1959 |

FOREIGN PATENTS

| | | |
|---|---|---|
| 294,375 | Switzerland | Nov. 15, 1953 |